United States Patent
Vbh et al.

(10) Patent No.: US 11,736,481 B2
(45) Date of Patent: Aug. 22, 2023

(54) FRICTION-LESS IDENTITY PROOFING DURING EMPLOYEE SELF-SERVICE REGISTRATION

(71) Applicant: ADP, Inc., Roseland, NJ (US)

(72) Inventors: Kalyan Vbh, Hyderabad (IN); Frank Villavicencio, Roseland, NJ (US); Pavan Katamveera, Hyderabad (IN)

(73) Assignee: ADP, Inc., Roseland, NJ (US)

( * ) Notice: Subject to any disclaimer, the term of this patent is extended or adjusted under 35 U.S.C. 154(b) by 505 days.

(21) Appl. No.: 16/376,882

(22) Filed: Apr. 5, 2019

(65) Prior Publication Data

US 2020/0322335 A1 Oct. 8, 2020

(51) Int. Cl.
*H04L 29/06* (2006.01)
*H04L 9/40* (2022.01)

(52) U.S. Cl.
CPC ........ *H04L 63/0884* (2013.01); *H04L 63/083* (2013.01); *H04L 63/0807* (2013.01); *H04L 63/1433* (2013.01)

(58) Field of Classification Search
CPC ............. H04L 63/0884; H04L 63/0807; H04L 63/083; H04L 63/1433
See application file for complete search history.

(56) References Cited

U.S. PATENT DOCUMENTS

| | | |
|---|---|---|
| 8,745,698 B1 | 6/2014 | Ashfield et al. |
| 9,348,981 B1 | 5/2016 | Hearn et al. |
| 9,660,989 B1 * | 5/2017 | Fredinburg ............. G06F 21/41 |
| 2003/0135734 A1 | 7/2003 | Fagan et al. |
| 2006/0021004 A1 | 1/2006 | Moran et al. |
| 2011/0307381 A1 * | 12/2011 | Kim ........................ G06Q 20/40 705/44 |
| 2013/0086657 A1 * | 4/2013 | Srinivasan ............ H04L 9/3234 726/6 |

(Continued)

FOREIGN PATENT DOCUMENTS

CN 106982193 A * 7/2017 ......... H04L 63/1441

OTHER PUBLICATIONS

"Enable Seamless, Secure Access with Adaptive Authentication and Authorization," Ping Identity, Aug. 2017, 13 pages.

(Continued)

*Primary Examiner* — Benjamin E Lanier
(74) *Attorney, Agent, or Firm* — Foley & Lardner LLP (57) ABSTRACT

A method for proving identity when registering for a service includes presenting by the entity a user with options for registering for the service, wherein the options comprise validating an identity of the user through a trusted partner. The method includes receiving, by the entity, user data from the trusted partner responsive to the user logging into a page on the trusted partner. The method includes validating the user identity for the service responsive to a determination that a user identifier from the trusted partner matches a user identifier on record with the entity. The method includes populating entity user data for the service according to the user data received from the trusted partner responsive to successfully validation of the user identity. In embodiments, a risk analysis score is determined for the user and registration steps for registering are selected based on comparison of the registration score with a threshold.

20 Claims, 5 Drawing Sheets

(56) References Cited

U.S. PATENT DOCUMENTS

| | | | | |
|---|---|---|---|---|
| 2014/0259135 A1* | 9/2014 | Postrel | ................ | H04L 63/0807 |
| | | | | 726/7 |
| 2016/0269379 A1* | 9/2016 | Livesay | ............. | G06K 9/00288 |
| 2018/0013565 A1* | 1/2018 | Fox | ....................... | H04L 9/0643 |
| 2018/0268056 A1* | 9/2018 | Gharabegian | .......... | G11B 27/34 |
| 2018/0343246 A1* | 11/2018 | Benayed | ................. | G06F 21/62 |
| 2019/0266314 A1* | 8/2019 | Trelin | ................. | G06K 9/00288 |
| 2019/0356679 A1* | 11/2019 | Sites | ................... | H04L 63/1433 |
| 2019/0384794 A1* | 12/2019 | Holly, Jr. | ................ | G06F 21/41 |
| 2020/0244640 A1* | 7/2020 | Itzhaki | .................... | G06F 21/31 |
| 2020/0302543 A1* | 9/2020 | Corretjer | ............. | G06F 21/6245 |
| 2021/0056562 A1* | 2/2021 | Hart | ................... | G06Q 20/4014 |

OTHER PUBLICATIONS

"SecureKey Concierge," Did You Know, 2017, SecureKey Technologies, 3 pages, http://1h7gwkpz6sk2qtcdf2oqmt01-wpengine.netdna-ssl.com/wp-content/uploads/sites/3/2017/02/did-you-know-trifold-brochure-2017-WEB.pdf.

* cited by examiner

FRICTION-LESS IDENTITY PROOFING DURING EMPLOYEE SELF-SERVICE REGISTRATION

BACKGROUND INFORMATION

1. Field

The present disclosure relates generally to an improved computer system and, in particular, to identity proofing during a registration process.

2. Background

Employers, financial service providers, and insurers increasingly provide access to user accounts through online services available via the Internet. These online services allow the user to access their accounts to view and manage things such as their pay, benefits, retirement accounts, bank accounts, etc. Although such online services are convenient for the user, they provide many opportunities for criminal elements to obtain the user's confidential information and to use that information fraudulently to the detriment of the user.

A system that reduces the risk of the user confidential information being compromised is desirable.

SUMMARY

An illustrative embodiment provides a computer implemented method for proving identity when registering for a service provided by an entity. The method includes presenting by the entity a user with options for registering for the service, wherein the options comprise validating an identity of the user through a trusted partner. The method also includes receiving, by the entity, user data from the trusted partner responsive to the user logging into a page on the trusted partner. The method also includes validating the user identity for the service responsive to a determination that a user identifier from the trusted partner matches a user identifier on record with the entity. The method also includes populating entity user data for the service according to the user data received from the trusted partner responsive to successfully validation of the user identity.

Another illustrative embodiment provides a computer implemented method for authenticating a user identity. The method includes receiving user non-sensitive personally identifying information (PII). The method also includes determining a risk score for the user non-sensitive PII according to a risk evaluation analysis, wherein the risk score is determined according to a third-party risk analyzer, and wherein only non-sensitive PII is exchanged between the registration entity and the third-party risk analyzer. The method also includes authenticating the user if the risk score indicates a low risk that the person attempting to register is not the user.

Yet another illustrative embodiment provides a computer implemented method for proving identity when registering for a service provided by an entity. The method includes presenting, by the entity, options for registering for the service to a user. The options includes a first option of validating an identity of the user through a trusted partner and a second option of validating the identity of the user through receipt of personal identifying information (PII) from the user and applying a risk analysis evaluation to the PII. The method also includes validating the user identity for the service responsive to successful completion of the first or second option.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that self-service registration systems require a significant amount of a user's time in completing a registration process for registering with a service, such as, for example, a service that provides access to an employee's payroll and benefits information.

The illustrative embodiments further recognize and take into account that self-service registration systems potentially make sensitive user data such as financial information available to would-be hackers to fraudulently misuse.

The illustrative embodiments provide a user self-service registration system that is quick and easy to use for a user and that results in greater success in completing a registration process. The illustrative embodiments also provide a user self-service registration system with increased security as compared to existing systems that minimizes the opportunity for unauthorized access to a user's sensitive information.

Figure 1:
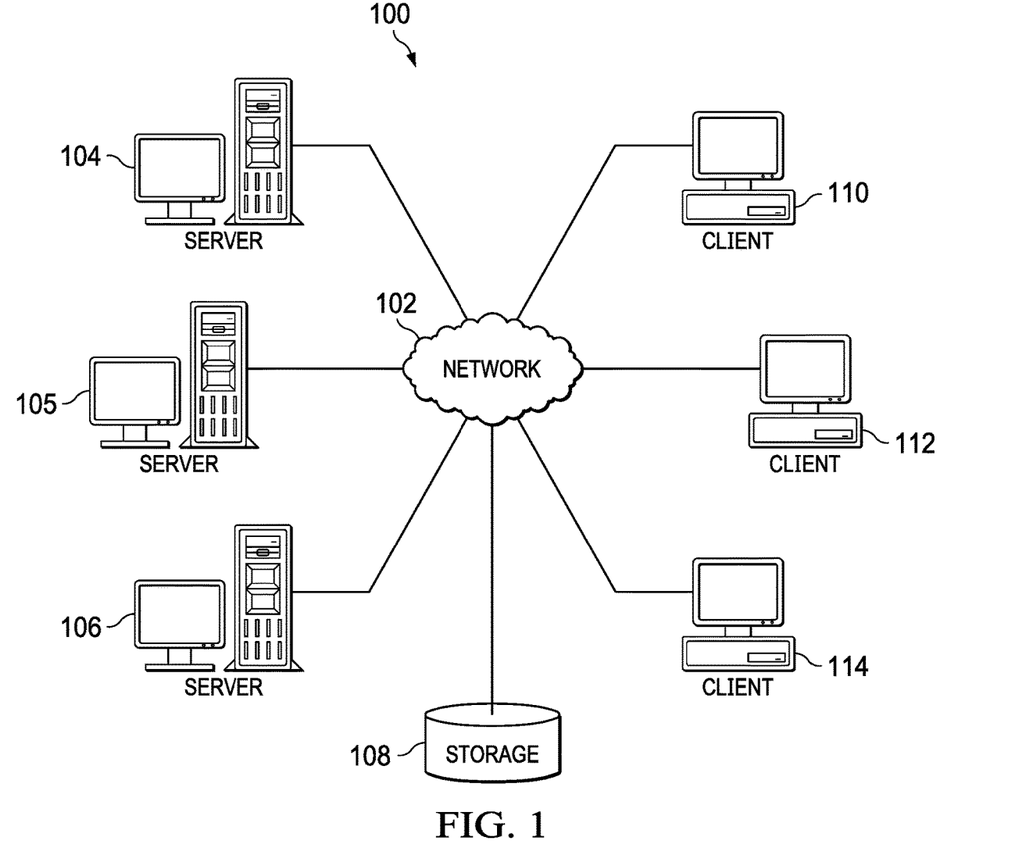
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104, server computer 105, and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104, server computer 105, and/or server computer 106 provide information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
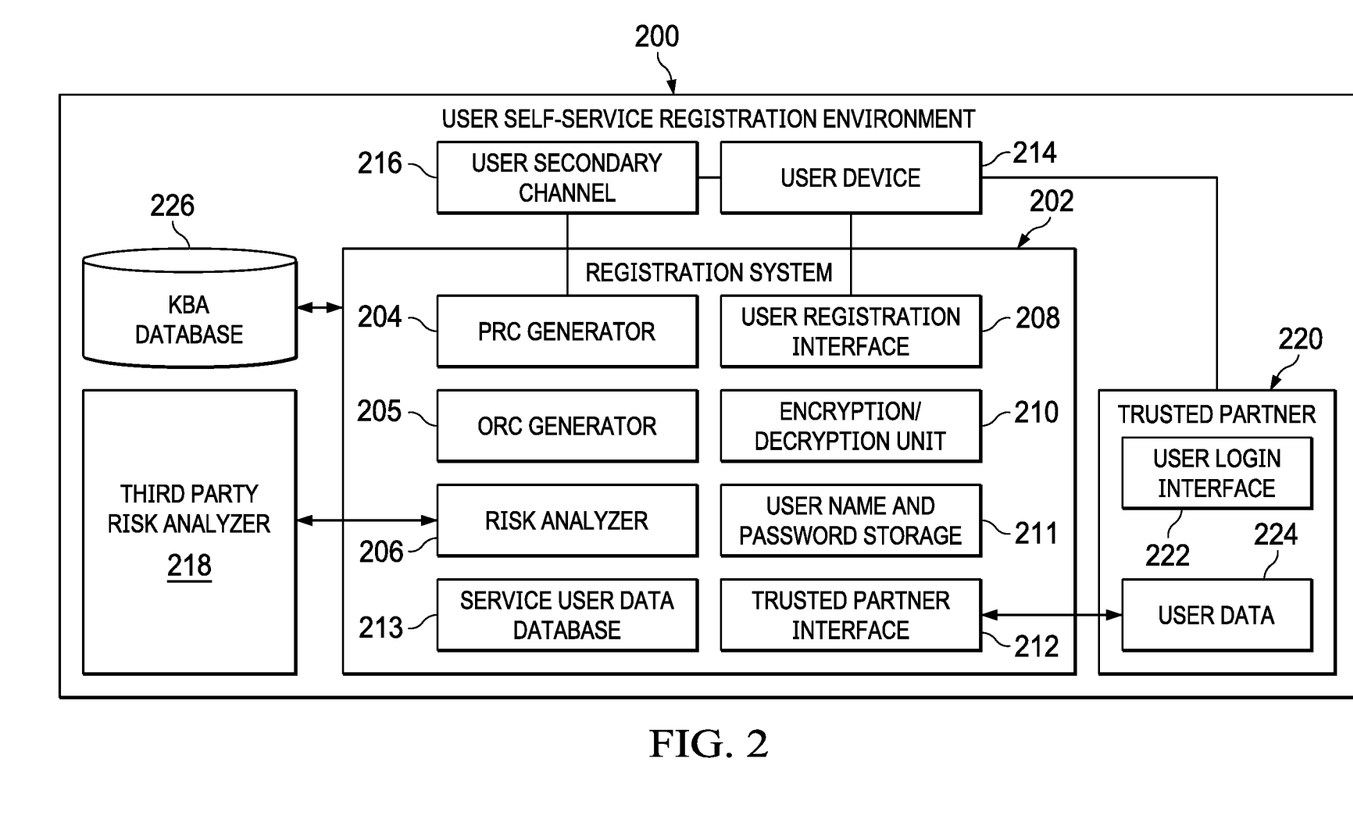
FIG. 2 is a block diagram of a user self-service registration environment in accordance with an illustrative embodiment.

Turning now to FIG. 2, a block diagram of a user self-service registration environment is depicted in accordance with an illustrative embodiment. User self-service registration environment 200 includes registration system 202, user device 214 used to register with the registration system, trusted partner 220, third-party risk analyzer 218, and knowledge-based authentication (KBA) database 226 containing questions and answers to aid in authenticating the user, the questions, and answers obtained from publicly available information. Registration system 202 may be implemented as, for example, server 104 in FIG. 1. User device 214 may be implemented as client computer 112 in FIG. 1. Trusted partner 220 may be implemented as server 105 in FIG. 1 and third-party risk analyzer 218 may be implemented as server 106 in FIG. 1. KBA database 226 may be implemented as storage 108 in FIG. 1.

Registration system 202 allows a user to register for a service such as, for example, a payroll and benefits service that allows the user to view data and information related to their salary, insurance benefits, taxes, retirement account, and/or any other of a number of types of information. Registration system 202 and the service for which access is provided via registration system 202 may be provided directly by an employer or may be a service provided by a third-party contracting to the employer.

Registration system 202 includes user registration interface 208, encryption/decryption unit 210, trusted partner interface 212, personal registration code (PRC) generator 204, organization registration code (ORC) generator 205, user name and password storage 211, service user data database 213, and a risk analyzer 206. Registration system 202 authenticates the user to verify the user is who they claim to be and creates a user ID and password for the service for which the user is attempting to register upon successful authentication of the user and upon successfully receiving the user data. The user data may include, for example, first and last name, data of birth, a user unique identifier (e.g., a social security number (SSN), a passport number, a state issued driver's license number, other governmental issued identifier, an employer issued employee number, etc.). The user data may also include bank account numbers for direct deposit of the employees pay and retirement account numbers for depositing retirement income into.

User registration interface 208 is configured to provide an interface through which the user can register with registration system 202 through user device 214. The user device may be any number of devices for communication including a smart phone, a laptop computer, a desktop computer, and a tablet computer. User registration interface 208 creates prompts for the user to enter various data into user device 214. User registration interface 208 prompts the user to enter a registration code and determines whether the registration code received from the user is a PRC or an ORC. The ORC is generated by ORC generator 205 and provided to the organization or client of a service provider of the service for which the user is attempting to register. The organization or client provides the ORC to the user. The ORC is an organization wide code that multiple users may use to register for the service. If the organization or client uses a PRC, then the PRC generator 204 may generate a PRC code and provide it to the user via user secondary channel 216 such as via e-mailing the PRC to an e-mail address or via texting the code to a phone number known to belong to the user. User secondary channel 216 is a different channel from the communications channel used by user device 214 to enter registration information via user registration interface 208. User device 214 typically interacts with user registration interface 208 via a web based connection. However, although the communication channels may be different, the user may receive the PRC from PRC generator 204 via user secondary channel 216 using the same user device 214 as is used by the user to attempt registration with registration system 202. The user may be authenticated by successful use of the PRC.

The user may enter their data directly through user registration interface 208 using their user device 214 or alternatively which is described in more detail below with respect to FIG. 3, the user may provide authorization for their information to be shared from trusted partner 220 and be redirected to trusted partner 220 to login to user login interface 222. Upon successful authentication of the user to trusted partner 220, trusted partner 220 may transfer the user data from the trusted partner's user data 224 to registration system 202 via trusted partner interface 212. The user data is encrypted during transfer and encryption/decryption unit 210 in registration system 202 decrypts the encrypted data. More details concerning transfer of user data from the trusted partner in order to populate the user data for the service for which the registration system 202 is associated is described below with respect to FIG. 4. Once the user data is received, whether through entry by the user or through transfer from trusted partner 220, the data is stored in service user data database 213. User ID and password storage 211 stores the user login ID (or user name) and password created by the user subject to the rules in the registration system upon successful authentication of the user and successful receipt of the user data. The user ID may be auto-generated or created by the user during the course of the registration process. If the user ID is created by the user, the user ID will be subject to the rules of the registration system. In an embodiment, the user data, user login ID, and user password are encrypted by encryption/decryption unit 210 before storing in service user data database 213.

If the user cannot or does not want to have data transferred from trusted partner 220, the registration system can authenticate the user in other ways by either issuing another PRC generated by PRC generator 204 and sent to the user over user secondary channel 216 or through successfully answering a query of a KBA question or a series of KBA questions determined from KBA database 226. KBA database 226 may be a third-party database or may be a database controlled by registration system 202. KBA database 226 contains a number of questions and answers specific to the user that are obtained from publicly available sources. In order to prevent fraud and authenticate the user, the registration system may obtain a risk score from third-party risk analyzer 218 and analyzed by risk analyzer 206 to determine the risk that the user attempting to register is attempting to do so fraudulently (i.e., that the user is not who they claim to be). For higher risk attempted registrations, the authentication process may be more involved. For lower risk attempted registrations, the authentication process may be less involved. Third-party risk analyzer 218 may create a risk score based on publicly available information about the user and/or about the location from which the user is attempting to register. The algorithm for determining the risk score is agreed upon by the provider of the registration service and the third-party risk analyzer. The risk score may be compared to a threshold to determine whether the attempted registration is high or low risk. The threshold may be dynamically determined and change over time as more information is obtained about what constitutes high and low risk based on previous registration attempts.

Figure 3:
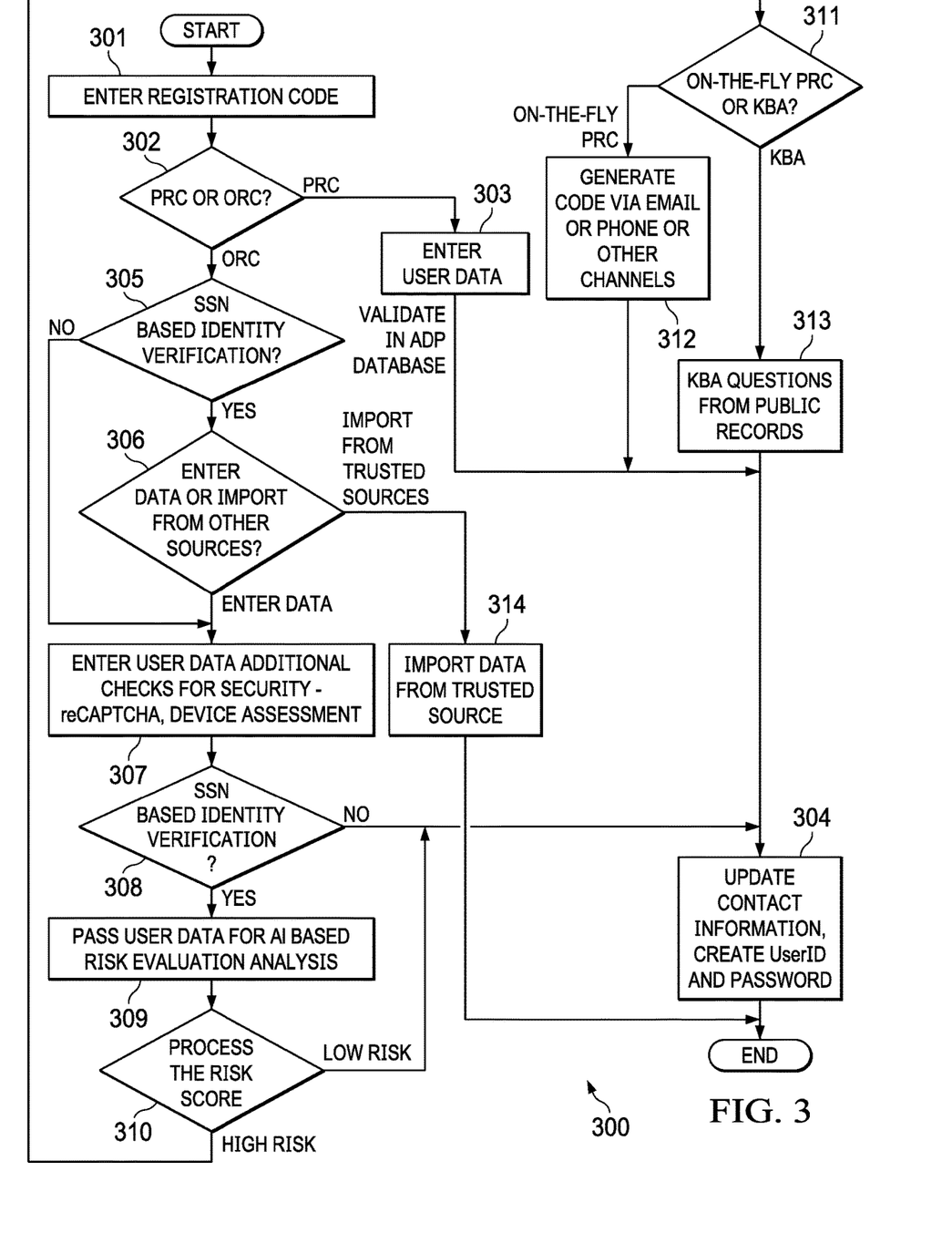
FIG. 3 is a flowchart of an exemplary self-service process for registering a user to a service in accordance with an illustrative embodiment.

Turning now to FIG. 3, a flowchart of an exemplary self-service process for registering a user to a service is depicted in accordance with an illustrative embodiment. Process 300 may be implemented in user self-service registration environment 200. Process 300 begins with a user entering a registration code (step 301) into an interface of a registration system. Next, the registration system determines whether the registration code is an organization registration code (ORC) or a personal registration code (PRC) (step 302). The ORC is unique to the client (e.g., an employer utilizing the registration service) but shared across all employees of the client. The PRC is unique for each employee within the client and typically expires after a specified period (e.g., 15 days after being issued). In an embodiment, the PRC registration is more secure and has a higher success rate (i.e., a user successfully registering with a service) than the ORC registration.

If the registration system determines that the registration code is a PRC, then the process proceeds to step 303 where the user enters data (e.g., user identity number, first name, last name, data of birth, etc.). In an embodiment, the user identity number is a social security number (SSN), but can be any number, such as a state issued driver's license number, a passport number, etc., that uniquely identifies the user. Once the data has been entered at step 303, process 300 proceeds to step 304 where the user contact information is updated in the registration system database and the user creates a system user identification (i.e., a user name) and a password, after which, process 300 ends. Although not shown in FIG. 3, in some embodiments, a user registering using a PRC may elect to have their data imported from a trusted partner in a manner similar to that described below for user's using an ORC and shown in FIG. 3.

If, at step 302, the registration system determines that the registration code is an ORC, then process 300 proceeds to step 305 where the registration system determines whether the user will perform SSN based identity verification. If, yes, then process 300 proceeds to step 306 where the registration service determines whether the user will enter the data manually or whether the data will be imported from other trusted sources. If the data will be imported from trusted sources at step 306, then process 300 continues to step 314 where the data is imported from a trusted source, after which, process 300 ends. A trusted source is another entity, such as a bank, an insurance company, a financial institution, or some other entity which the provider of the registration service trusts and with which the user has an account. The user will log into their account with the trusted source and provide authorization for the trusted source to transfer the user's data to the provider of the registration service. The data transferred is encrypted thereby preserving security.

Furthermore, the registration process is simplified and the time to register reduced, thereby improving the user experience in registering for the service. More details about importing data from a trusted source are provided in FIG. 4 and described below.

If, at step 306, the user desires to enter their data directly, or if, at step 305, the user indicates that SSN based identity verification will not be performed, process 300 proceeds to step 307 where the user enters the user data and the registration system performs additional security checks to prevent fraudulent access to the data provided by the entity with which the user is attempting to register. The additional security checks may include requesting additional information from the user. The user may select manual data entry at step 306 for a variety of reasons. For example, the user may not have an account with an entity which is a trusted partner with the provider of the registration service. As another example, the user may not wish to allow the provider of the registration service to access information from one of the user's other accounts. However, regardless of the reason, if the user selects the choice of entering the data manually at step 306, the process proceeds to step 307.

Next, the registration service determines whether SSN based identity verification will be conducted (step 308). If, at step 308, no SSN based identity verification will occur, then process 300 proceeds to step 304 where the user contact information is updated and a user ID and password are created. If, at step 308, SSN based identity verification will be performed, then process 300 proceeds to step 309 where user personal identifying information (PII) is passed to a risk evaluation analyzer for risk analysis. In an embodiment, the risk analysis is an artificial intelligence (AI) based risk analysis and the criteria for determining high and low risk may be updated occasionally to reflect better information. In an embodiment, the risk evaluation analyzer is a third-party risk analyzer and that PII passed to the risk evaluation analyzer contains only non-sensitive PII. Examples of non-sensitive PII include a user's first and last name, the user's data of birth, the user's e-mail address, and the user's telephone number. This information is generally publicly available and is usually insufficient for someone to use to steal a user's identity or to access sensitive information like the user's bank account, etc. Examples of sensitive PII include the user's social security number (SSN), the user's driver's license number, the user's passport number, etc.

Next, the risk analyzer processes the risk score and determines whether there is a high or low risk as to whether the person attempting to register is not the person corresponding to the SSN or other sensitive PII (step 310). The score is determined by the third-party according to data analysis and policy agreed upon by both the third-party and the registration system. The threshold for determining whether the risk score corresponds to a high risk or a low risk is dynamically determined and can be revised periodically to reflect updated information about the risks associated with various factors. Factors used in determining the risk may include the location of the attempt to register, the known location of the user's residence, the known location of the user's employer, other user specific data, etc. For example, in some embodiments, an attempt to register from a location that is in a vastly different location from the known residence of the user, such as in a different country, may be a factor that increases the risk score as it is more likely that the person attempting to register is not the user corresponding to the SSN or other sensitive PII. In an embodiment, the location of the registration attempt may be determined from the IP address of the device the person is using to register. In an embodiment, a higher risk score indicates a higher risk and determining whether there is a high risk of identity fraud is based on whether the risk score exceeds a threshold. Scores below the threshold would be considered low risk in this embodiment. In other embodiments, a lower risk score indicates a higher risk and determining whether there is a high risk of identity fraud is based on whether the risk score is below a threshold. In various embodiments, the risk scores that are equal to the threshold value may be considered high risk or low risk, depending on implementation. The threshold score for determining whether the attempted user registration is high or low risk may change over time based on additional data.

If the risk score indicates a low risk of fraud (i.e., a low risk that the person attempting to register is not the user corresponding to the user identifier (e.g., SSN)), then process 300 continues to step 304, after which, process 300 ends. If the risk score indicates there is a high risk that the person attempting to register is not the user corresponding to the sensitive PII, then process 300 proceeds to step 311 where the registration system determines whether the user will register on-the-fly using a personal registration code (PRC) or using knowledge based authentication (KBA).

If, at step 311, the user elects on-the-fly PRC, then process 300 proceeds to step 312 where the registration system generates a code and sends it to the user via e-mail, telephone, or other channels known to belong to the user. Upon successful entry of the code into the registration system by the user, process 300 proceeds to step 304 where the user contact information is updated and a user ID and password are created for the user, after which, process 300 ends.

If, at step 311, the user elects KBA for further authenticating the user, process 300 proceeds to step 313 where KBA questions are generated from public records and presented to the user. Upon successfully answering at least one KBA question, the process proceeds to step 304 where the user contact information is updated and a user ID and password are created for the user, after which, the process 300 ends. In some embodiments, the user must successfully answer more than one KBA question, such as, for example, at least three KBA questions.

If, at step 312, step 313, or other places within the process 300, the user is unsuccessful in providing the PRC code, appropriate answers to the KBA questions, or successfully answering other questions, process 300 may end. If the user wishes to still keep trying to register, the user may need to start over at step 301. In order to further prevent fraud, in some embodiments, the user is not allowed to start over until a client administrator or a registration service administrator resets the registration system for this user. The process of ending the registration process and for locking out the user may be utilized at any point in process 300 in which the user fails to successfully provide answers to the questions presented to them. In various embodiments, the user may be provided with a limited number of tries to successfully answer a question before being locked out.

Figure 4:
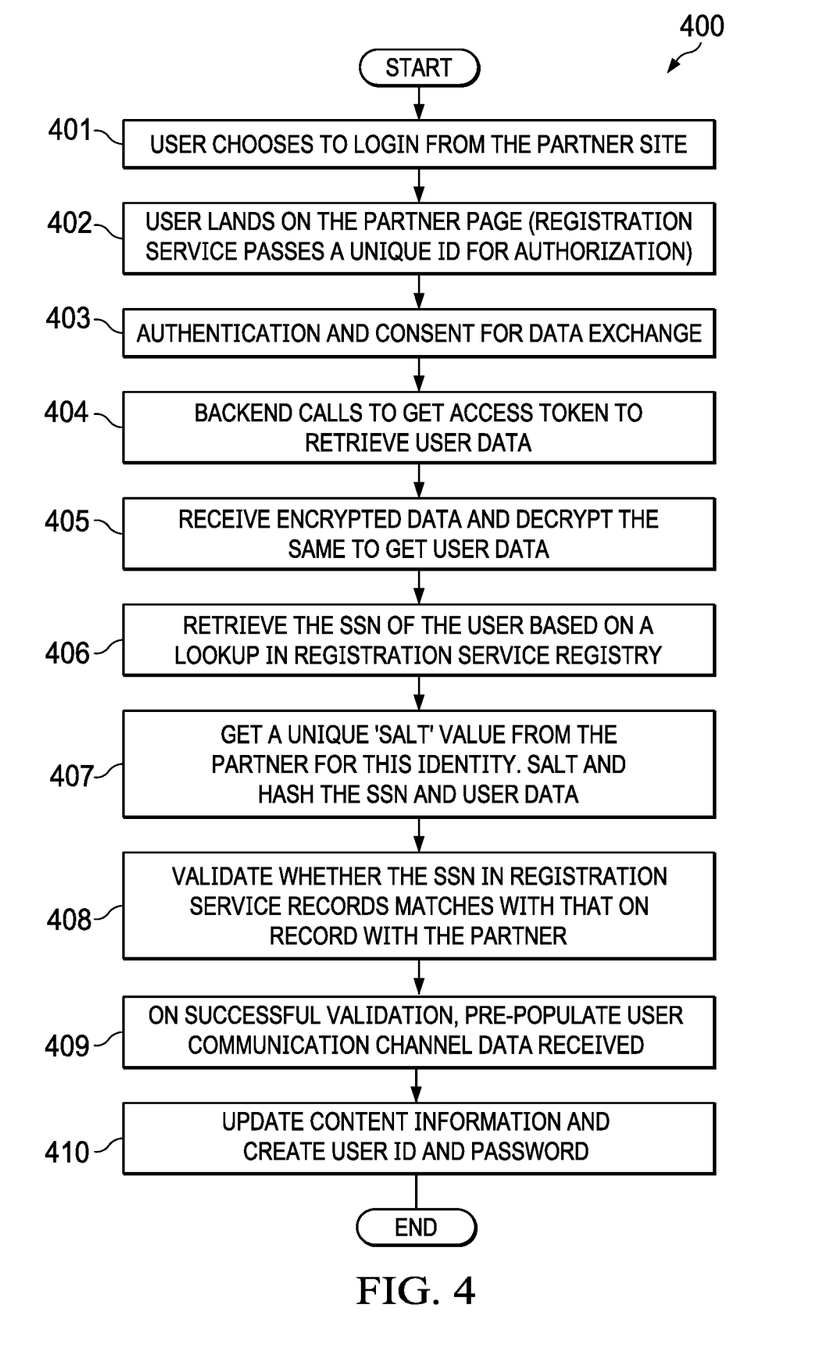
FIG. 4 is a flowchart of an exemplary self-service process for importing user data from a trusted partner to a service in accordance with an illustrative embodiment.

Turning now to FIG. 4, a flowchart of an exemplary self-service process for importing user data from a trusted partner to a service is depicted in accordance with an illustrative embodiment. Process 400 may be implemented in user self-service registration environment 200 in FIG. 2. Process 400 may be implemented at step 314 in FIG. 3.

Process 400 begins with a user choosing to log into a partner site in order to provide the information to the registration service necessary to complete the registration (step 401). Next, the user lands on the trusted partner web page and the registration system passes a unique identifier for authorization (step 402). Next, the user authenticates their account to the trusted partner and consents to data exchange between the trusted partner and the registration service (step 403). The registration system then performs a backend call to the trusted partner to obtain a token (also referred to as an access token) and to retrieve user data (step 404). The token is used to determine that the registration system is authorized to exchange data with the trusted partner. The registration system then receives encrypted data from the trusted partner and decrypts the encrypted data to obtain the user data (step 405). The registration system retrieves the SSN (or other unique identifier (e.g., driver's license number, passport number, etc.) of the user based on a lookup in a registry of the registration system (step 406). Next, the registration system obtains a unique "salt" value from the trusted partner for this identity and the hash function used by the trusted partner. Then the registration system salts and hashes the SSN and user data (step 407). A salt value is a random data that is used as an additional input to a one-way hash function. Salting and hashing data are well known to those of ordinary skill in the art. The registration system then validates whether the user identifier (e.g., SSN) in the registration system's records match with that on record with the partner (step 408). In an embodiment, the registration system validates the SSN by sending the salted and hashed user identifier (e.g., SSN) to the trusted partner. The trusted partner matches whether the user identifier from the registration system matches with what they have on their record by comparing the hash values of the user identifier. The trusted partner then returns a match or no match status to the registration system. In an alternate embodiment, the registration system validates the user by comparing the user identifier (e.g., SSN) from the registration system's records with the encrypted value of the SSN received from the trusted partner (after decrypting the encrypted value) to determine whether the two values match. Upon successfully receiving validation of the SSN, the registration system pre-populates the user data with the data received from the trusted partner (step 409). Finally, the content information is updated the user ID and password are created (step 410), after which, the process 400 ends. Because the user is spared the time and trouble of entering their data manually due to the importing of their data from the trusted partner, the user can complete the registration process quicker, and in some embodiments, at least twice as fast as possible with manual data entry. Furthermore, because the partner providing the data is a trusted partner, meaning that the registration service trusts that the partner vets the data as well or better than the registration system does, the registration system has assurance that the data is accurate. Furthermore, the transfer of data is performed via encryption and with the use of tokens, thereby ensuring that the registration process has bank grade security.

Figure 5:
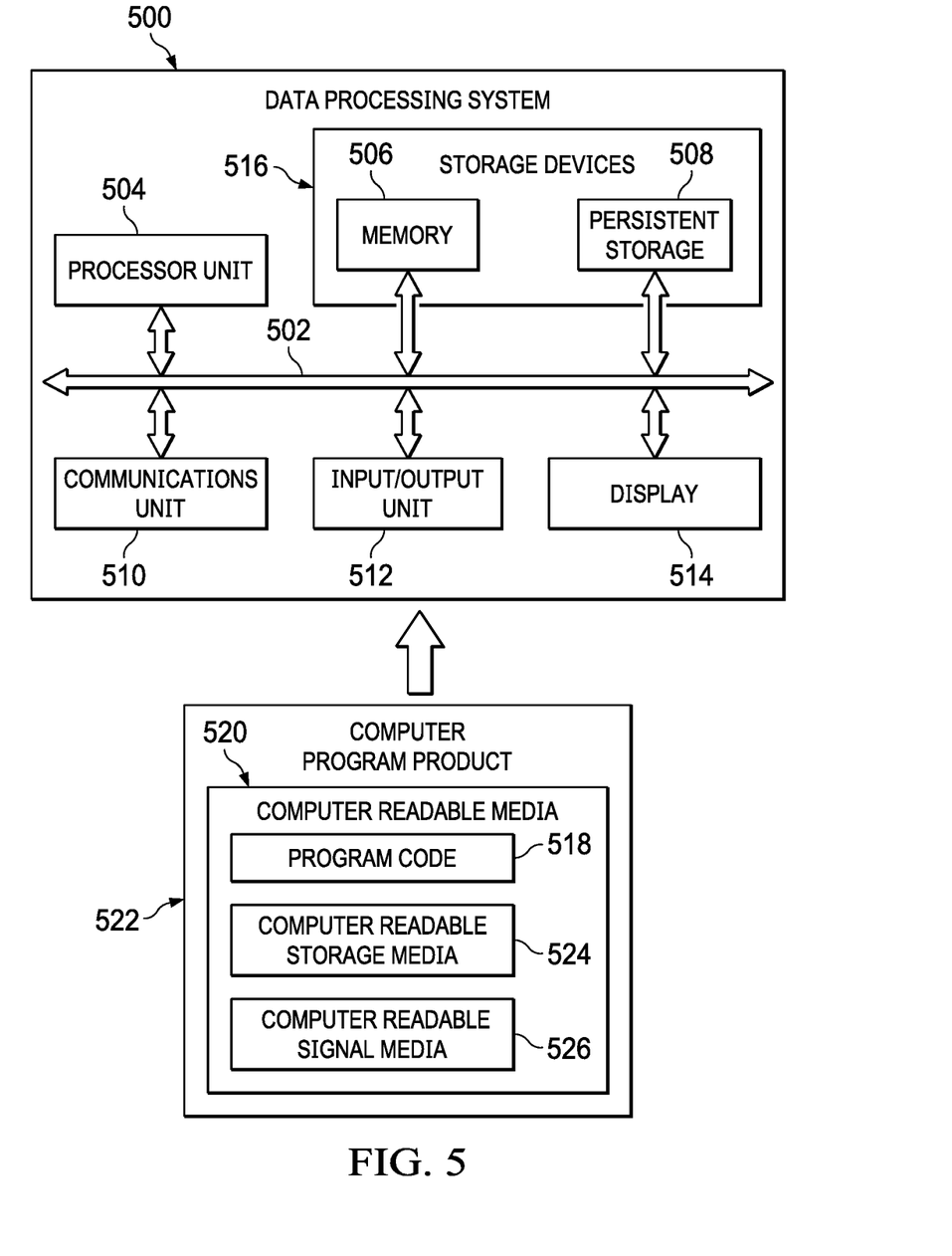
FIG. 5 is an illustration of a block diagram of a data processing system in accordance with an illustrative embodiment.

Turning now to FIG. 5, an illustration of a block diagram of a data processing system is depicted in accordance with an illustrative embodiment. Data processing system 500 may be used to implement one or more computers, servers 104, 105, 106 and client computer systems 110, 112, 114 in FIG. 1. In this illustrative example, data processing system 500 includes communications framework 502, which provides communications between processor unit 504, memory 506, persistent storage 508, communications unit 510, input/output unit 512, and display 514. In this example, communications framework 502 may take the form of a bus system.

Processor unit 504 serves to execute instructions for software that may be loaded into memory 506. Processor unit 504 may be a number of processors, a multi-processor core, or some other type of processor, depending on the particular implementation. In an embodiment, processor unit 504 comprises one or more conventional general purpose central processing units (CPUs). In an alternate embodiment, processor unit 504 comprises one or more graphical processing units (CPUs).

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 516 may also be referred to as computer-readable storage devices in these illustrative examples. Memory 516, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508. Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through at least one of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer-usable program code, or computer-readable program code that may be read and executed by a processor in processor unit 504. The program code in the different embodiments may be embodied on different physical or computer-readable storage media, such as memory 506 or persistent storage 508.

Program code 518 is located in a functional form on computer-readable media 520 that is selectively removable and may be loaded onto or transferred to data processing system 500 for execution by processor unit 504. Program code 518 and computer-readable media 520 form computer program product 522 in these illustrative examples. In one example, computer-readable media 520 may be computer-readable storage media 524 or computer-readable signal media 526.

In these illustrative examples, computer-readable storage media 524 is a physical or tangible storage device used to store program code 518 rather than a medium that propagates or transmits program code 518. Alternatively, program code 518 may be transferred to data processing system 500 using computer-readable signal media 526.

Computer-readable signal media 526 may be, for example, a propagated data signal containing program code 518. For example, computer-readable signal media 526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code 518.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for proving identity when registering for a service provided by an entity, comprising:
presenting, by the entity, a user with options for registering for the service, wherein the options comprise a first option of validating a user identity through a trusted partner and a second option of validating the user identity through receipt of personally identifying information from the user;
responsive to selection of the first option:
receiving, by the entity, user data from the trusted partner responsive to the user logging into a page on the trusted partner;
validating a user identity for the service responsive to a determination that a user identifier from the trusted partner matches a user identifier on record with the entity;
populating entity user data for the service according to the user data received from the trusted partner responsive to successful validation of the user identity;
responsive to selection of the second option:
receiving, by the entity, personally identifying information data from the user;
applying a third party artificial intelligence risk analysis evaluation to the personally identifying information data received to generate a risk score;
updating a risk score criteria to change a threshold risk score to identify low risk and high risk authentications in response to changes in information comprising previous locations of a device performing registration attempts;
authenticating the user if the risk score, when compared to the risk score criteria, indicates a low risk that a person attempting to register is not the user; and
populating entity user data for the service according to user data received from the user responsive to successful authentication of the user identity.

2. The method of claim 1, wherein the user data from the trusted partner comprises an encrypted value.

3. The method of claim 2, further comprising:
decrypting the user data received from the trusted partner.

4. The method of claim 2, wherein the user data comprises a first name, a last name, and a date of birth of the user.

5. The method of claim 2, wherein the user data comprises a user identifier.

6. The method of claim 5, wherein the encrypted value of the user identifier received from the trusted partner comprises a salt value of the user identifier.

7. The method of claim 6, further comprising:
receiving the salt value and a hash function from the trusted partner;
salting and hashing the user identifier on record with the entity to produce an entity salted and hashed user identifier;

sending the entity salted and hashed user identifier to the trusted partner; and receiving an indication from the trusted partner that the entity salted and hashed user identifier matches a trusted salted and hashed user identifier.

8. The method of claim 1, further comprising:

receiving an access token from the trusted partner, the access token allowing the entity to retrieve the user data from the trusted partner.

9. The method of claim 1, wherein the user identifier comprises a social security number.

10. A computer implemented method for authenticating a user identity for a user, the method comprising:

receiving, by a registration entity, user non-sensitive personally identifying information;

determining a risk score for the user non-sensitive personally identifying information according to a risk evaluation analysis, wherein the risk score is determined according to a third party artificial intelligence-based risk analyzer, and wherein only non-sensitive personally identifying information is exchanged between the registration entity and the third party artificial intelligence-based risk analyzer;

updating a risk score criteria to change a threshold risk score to identify low risk and high risk authentications in response to changes in information comprising previous locations of a device performing registration attempts; and authenticating the user if the risk score, when compared to the risk score criteria, indicates a low risk that a person attempting to register is not the user.

11. The method of claim 10, further comprising:

requesting additional information from the user if the risk score indicates a high risk that the person attempting to register is not the user.

12. The method of claim 11, further comprising:

generating a personal registration code; and sending the personal registration code to the user through a secondary channel.

13. The method of claim 12, wherein the secondary channel comprises one of an e-mail and a phone number.

14. The method of claim 12, further comprising:

authenticating the user upon successful use of the personal registration code.

15. The method of claim 11, further comprising:

presenting the user with a query of at least one knowledge based authentication (KBA) question; and authenticating the user when the user successfully answers the at least one KBA question.

16. The method of claim 15, wherein the at least one KBA question comprises at least three KBA questions and the authenticating is performed only if the user successfully answers the at least three KBA questions.

17. A computer implemented method for proving identity when registering for a service provided by an entity, comprising:

presenting, by the entity, options for registering for the service to a user, wherein the options comprise a first option of validating a user identity through a trusted partner and a second option of validating the user identity through receipt of personally identifying information from the user;

applying a third party artificial intelligence-based risk analysis evaluation to the personally identifying information to generate a risk score;

updating a risk score criteria to change a threshold risk score to identify low risk and high risk authentications in response to changes in information comprising locations of a device performing previous registration attempts;

validating the user if the risk score, when compared to the risk score criteria, indicates a low risk that a person attempting to register is not the user; and validating the user identity for the service responsive to successful completion of the first option or the second option.

18. The method of claim 17, further comprising:

receiving, by the entity, user data from the trusted partner responsive to the user logging into a page on the trusted partner; and validating the user identity for the service responsive to a determination that a user identifier from the trusted partner matches a user identifier on record with the entity.

19. The method of claim 18, further comprising:

populating entity user data for the service according to the user data received from the trusted partner responsive to successfully validation of the user identity.

20. The method of claim 17, further comprising:

receiving user non-sensitive personally identifying information;

determining an additional risk score for the user non-sensitive personally identifying information according to the risk evaluation analysis, wherein the risk score is determined according to a third-party risk analyzer, and wherein only non-sensitive personally identifying information is exchanged between the entity and the third-party risk analyzer; and authenticating the user if a combined risk score indicates a low risk that the person attempting to register is not the user.

* * * * *